US007143163B1

(12) United States Patent
Bleichenbacher et al.

(10) Patent No.: US 7,143,163 B1
(45) Date of Patent: Nov. 28, 2006

(54) SYSTEM AND METHOD FOR EXACTING A SYSTEM RESOURCE ACCESS COST

(75) Inventors: Daniel Bleichenbacher, Sumit, NJ (US); Bjorn M. Jakobsson, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1221 days.

(21) Appl. No.: 09/625,817

(22) Filed: Jul. 26, 2000

(51) Int. Cl.
*H04L 9/00* (2006.01)
*G06F 15/16* (2006.01)

(52) U.S. Cl. ............. 709/225; 709/226; 709/229; 713/168

(58) Field of Classification Search ........ 709/229, 709/228; 705/27, 75, 77, 80, 37; 713/201, 713/181; 707/7, 6, 2, 4, 101, 3, 5; 704/9, 704/2, 8; 714/26, 47; 706/16; 726/3, 6
See application file for complete search history.

(56) References Cited

U.S. PATENT DOCUMENTS

| | | | |
|---|---|---|---|
| 5,919,257 A * | 7/1999 | Trostle | 726/22 |
| 6,236,972 B1 * | 5/2001 | Shkedy | 705/1 |
| 6,341,353 B1 * | 1/2002 | Herman et al. | 713/201 |
| 6,424,971 B1 * | 7/2002 | Kreulen et al. | 707/7 |
| 6,519,571 B1 * | 2/2003 | Guheen et al. | 705/14 |
| 6,523,067 B1 * | 2/2003 | Mi et al. | 709/229 |
| 6,944,765 B1 * | 9/2005 | Rose et al. | 713/181 |

OTHER PUBLICATIONS

Juels et al. (Client Puzzles: a Cryptographic countermeasure against connection depletion attacks: Proceedings of NDSS'99 (Network and distributed security systems).*
Tuomas Aura et al., DOs-resistant Authentication with Client Puzzles, The 8th International Workshop on Security Protocols, Apr. 2000, 7 pages.*
Ari Juels and John Brainard; Client Puzzles: A Cryptographic Countermeasure Against Connection Depletion Attacks; Proceedings of NDSS '99 (Networks and Distributed Security Systems); 1999; pp. 151-165.
Bruce Schneier; Applied Cryptography, Protocols, Algorithms, and Source Code in C; John Wiley & Sons; Inc.; 2nd edition; 1996; pp. 1-758.

* cited by examiner

*Primary Examiner*—Patrice L. Winder (57) ABSTRACT

A system for, and method of, controlling access to a resource of a computer system. In one embodiment, the system includes: (1) a database of problems and corresponding precalculated solutions, (2) a problem retriever that responds to a request from a client for access to the resource by retrieving one of the problems from the database and transmitting the one of the problems to the client and (3) a solution evaluator that, upon receiving a putative solution from the client, employs the database to validate the putative solution and, if the putative solution is valid, grants the client access to the resource.

18 Claims, 5 Drawing Sheets

SYSTEM AND METHOD FOR EXACTING A SYSTEM RESOURCE ACCESS COST

TECHNICAL FIELD OF THE INVENTION

The present invention is directed, in general, to computer systems and, more specifically, to a system and method for exacting access costs regarding computer system resources.

BACKGROUND OF THE INVENTION

The distribution and processing of information have been revolutionized by the use of computers connected to a network. At first, the networks were small and contained within a local area. These small networks were called local area networks ("LANs") LANs allowed small numbers of users to efficiently distribute information and files among each of the computers connected to the LAN. Soon thereafter, several LANs were connected together forming a wide area network ("WAN"). WANs allowed users to exchange information across networks located in different geographic areas. Currently, one of the largest computer networks is the Internet.

The Internet is a worldwide interconnection of computer networks that communicate using a common protocol and allows millions of computers from low-end personal computes to high-end super computers to communicate with each other. Physically, the Internet uses a portion of the total resource of the currently existing public telecommunication networks. Technically, what distinguishes the Internet is its use of a set of protocols called Transmission Control Protocol/Internet Protocol ("TCP/IP"). Two recent adaptations of Internet technology, the Intranet and the Extranet, also make use of the TCP/IP protocol.

One of the most rapidly expanding aspects of the Internet is the World Wide Web (the "Web"). The Web consists of computers (servers and clients) that are able to support the Hypertext Transfer Protocol ("HTTP"). HTTP is the set of rules for exchanging files, such as text, graphic images, sound, video and other multimedia files on the Web. Relative to the TCP/IP suite of protocols (which are the basis for information exchange on the Internet), HTTP is an application protocol.

Typically, most Web sites are accessed using a Web browser of which Netscape's Navigatort™ and Microsoft's Internet Explorer™ are the most popular. Using a Web browser, a user can subscribe to services, purchase items and retrieve information from business Web sites or any other Web site no matter where the user is located.

Due to the accessability of the Internet and the Web by vast number of users, Web sites and other computers connected to the Internet are potentially vulnerable to denial-of-service attacks by millions of sources. One type of denial-of-service attack is the connection depletion attack.

The connection depletion attack is one in which the attacker seeks to initiate and leave unresolved a large number of connections requests at a particular computer system ("server") that provides a service. The large number of unresolved connections causes the server to exhaust its resources and renders the server incapable of servicing legitimate requests. The "TCP SYN flooding" and the "e-mail bomb" attacks are examples of connection depletion attacks.

Accordingly, what is needed in the art is a better way to reduce the possibility of connection depletion attacks and still service legitimate requests.

SUMMARY OF THE INVENTION

To address the above-discussed deficiencies of the prior art, the present invention provides a system for, and method of, controlling access to a resource of a computer system. In one embodiment, the system includes: (1) a database of problems and corresponding precalculated solutions, (2) a problem retriever that responds to a request from a client for access to the resource by retrieving one of the problems from the database and transmitting the one of the problems to the client and (3) a solution evaluator that, upon receiving a putative solution from the client, employs the database to validate the putative solution and, if the putative solution is valid, grants the client access to the resource.

The present invention therefore introduces a protocol that allows a resource, such as a network server, to require a potential client to undergo some cost before being granted access to the resource. The present invention employs a database of precalculated problems and solutions to advantage, such that the resource is not unduly occupied generating problems and solutions for such potential clients. As a result, protocol efficiency is increased without sacrificing protocol integrity.

In one embodiment of the present invention, the problems comprise outputs and portions of corresponding inputs to a one-way function. The client is required to determine the remaining portion or portions of the inputs that when combined with the supplied portions of the corresponding inputs and the one-way function is applied, the produced outputs match the problem's outputs. In a more particular embodiment, the one-way function is a Message Digest-5 function. Other functions that impose a higher burden upon the client than on the resource are, however, within the broad scope of the present invention.

In one embodiment of the present invention, the problem retriever replaces the one of the problems and a corresponding one of the solutions when the putative solution is valid. In an alternative embodiment of the present invention, the problem retriever replaces the one of the problems and a corresponding one of the solutions only when the putative solution is valid. Thus, problem/solution pairs may be reused until solved, or may be replaced less often, as desired.

In one embodiment of the present invention, the solution evaluator grants the client access to the resource by allocating memory associated with the resource to serve the client.

In one embodiment of the present invention, the resource is selected from the group consisting of: (1) a network server, (2) an electronic mail server and (3) a main database. Those skilled in the pertinent art will perceive, however, that the present invention is advantageously employable with respect to any resource that may form part of a computer system, whether or not accessible via a network.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
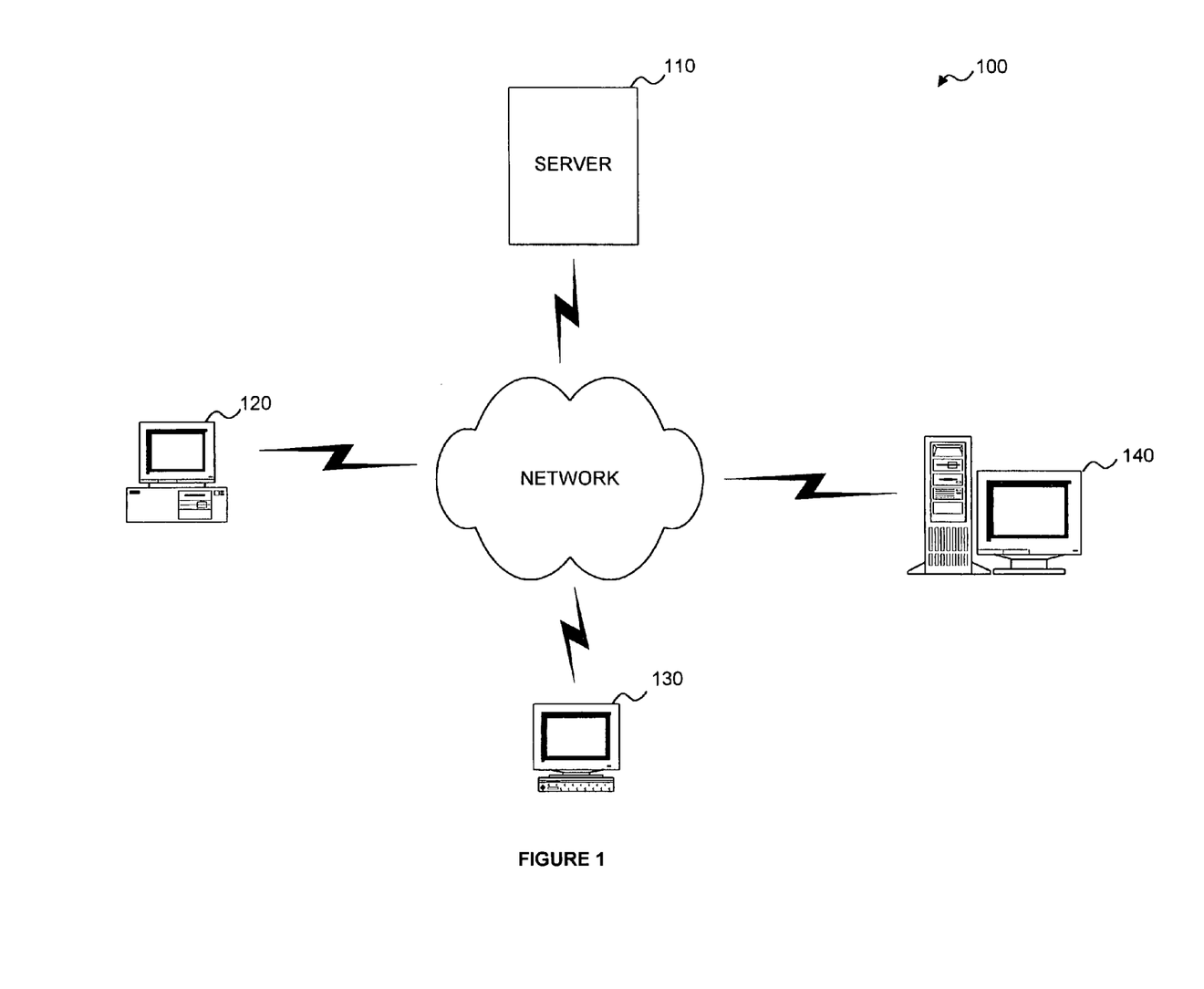
FIG. 1 illustrates a block diagram of an embodiment of a computer network constructed in accordance with the principles of the present invention.

Referring initially to FIG. 1, illustrated is a block diagram of an embodiment of a computer network, generally designated 100, constructed in accordance with the principles of the present invention. The computer network 100 is configured to distribute, collect and process information and may include a Local Area Network ("LAN"), a Wide Area Network ("WAN"), an Intranet, an Extranet, the Internet, the World Wide Web or a combination thereof. For purposes of the present invention, the World Wide Web is defined as all the resources and users on the Internet that are using the Hypertext Transfer Protocol ("HTTP"). In one embodiment of the present invention, the computer network 100 communicates to each device connected thereto using Transmission Control Protocol/Internet Protocol ("TCP/IP").

TCP/IP is a two-layered protocol. The higher layer, Transmission Control Protocol ("TCP"), manages the assembling of a message or file into smaller packets that are transmitted over the computer network 100 and received by a TCP layer that reassembles the packets into the original message. The lower layer, Internet Protocol ("IP"), handles the address part of each packet so that it gets to the right destination. Each gateway computer (not shown) on the computer network 100 checks the address to determine where to forward the message. Even though some packets from the same message are routed differently than others, the packets will be reassembled at the destination.

TCP/IP uses the client/server model of communication in which a computer user (a client) requests and is provided a service (such as sending a Web page) by another computer (a server) in the computer network 100. TCP/IP communication is primarily point-to-point, meaning each communication is from one point (or host computer) in the computer network 100 to another point or host computer. TCP/IP and the higher-level applications that employ TCP/IP are collectively said to be "stateless" because each client request is considered a new request unrelated to any previous one (unlike ordinary phone conversations that require a dedicated connection for the call duration). Being stateless frees the network paths so that everyone can use the paths continuously. It should be understood that the TCP layer itself is not considered stateless as far as any one message is concerned; the connection remains in place until all packets in a message have been received.

Internet users are familiar with the even higher layer application protocols that use TCP/IP to get to the Internet. The higher level application protocols include the World Wide Web's Hypertext Transfer Protocol ("HTTP"), the File Transfer Protocol ("FTP"), Telnet (a command and protocol that allows users to logon to remote computers), and the Simple Mail Transfer Protocol ("SMTP"). These and other protocols are often packaged together with TCP/IP.

Personal computer users usually access the Internet through the Serial Line Internet Protocol ("SLIP") or the Point-to-Point Protocol ("PPP"). These protocols encapsulate the IP packets such that the packets can be sent over a dial-up phone connection to an access provider's connection device such as a conventional modem.

Protocols related to TCP/IP include the User Datagram Protocol ("UDP"), the Internet Control Message Protocol ("ICMP"), the Interior Gateway Protocol ("IGP"), the Exterior Gateway Protocol ("EGP") and the Border Gateway Protocol ("BGP"). Depending on the circumstance, the UDP may be used instead of TCP for special network communication purposes. The aforementioned protocols, namely, ICMP, IGP, EGP and BGP, are often used by network host computers for exchanging router information.

Besides the Internet, TCP/IP may also be employed as the communication protocol in the private networks called Intranets and Extranets. An Intranet is a private network that is contained within an enterprise (such as a company's office building). The Intranet may consist of many interlinked LANs and use leased lines in a WAN. Typically, an Intranet includes connections through one or more gateway computers (not shown) to the outside Internet and can use TCP/IP, HTTP and other Internet protocols. The main purpose of an Intranet is to share company information and computing resources among employees. An Intranet can also be used to facilitate working in groups and for teleconferences.

An Extranet is a private network that uses the Internet protocols and the public telecommunication system to securely share part of a business's information or operations with suppliers, vendors, partners, customers, or other businesses. An Extranet can be viewed as part of a company's Intranet that is extended to users outside the company. Just like the Internet, an Extranet also uses HTML, HTTP, SMTP and other Internet protocols.

Within the environment of the computer network 100 is a server 110 that includes systems that allow the server to receive requests, perform specific tasks, retrieve and update information in at least one database and respond to requests sent over the computer network 100 to the server 110. In other embodiments, the computer network 100 may include multiple servers, each performing specific tasks, performing the same tasks, acting as redundant systems or acting as database sites.

In another embodiment of the present invention, the server 110 may be an application server. An application server is a computer in a distributed network containing specialized programs that provide the business logic for at least one application program located somewhere within the computer network 100. The application server is frequently viewed as part of a three-tier application, consisting of a graphical user interface ("GUI") server, an application (business logic) server, and a database and a transaction server. The first-tier of the application, also called "front-end," is usually located in a client computer such as a personal computer ("PC") or a workstation and may include a Web browser-based graphical user interface. The second-tier is the business logic application or set of applications and can be located on a LAN or an Intranet server.

The third-tier of the application, also called "back-end," is the database and transaction server and may be located on a mainframe or a large server. Older, legacy databases and transaction management applications are part of the back-end or third-tier. The application server is the middleman between the browser-based front-ends and the back-end databases and legacy systems.

The computer network 100 also includes a conventional personal computer ("PC") 120, a conventional workstation 130 and a conventional office computer system 140. In other embodiments, the computer network 100 may include any number of PCs 120, workstations 130 and office computer systems 140. In one embodiment of the present invention, the PC 120, the workstation 130 and the office computer system 140 are client computer systems. A client computer system includes a user interface that allows the user to access information, issue requests and perform functions related to the server 110. In another embodiment, the office computer system 140 may be configured as a second-tier type computer system.

One skilled in the pertinent art should know that the principles of the present invention are not limited for use with the types of devices described above. In other embodiments, the computer network 100 may include different types of systems that have Internet capability.

Figure 2:
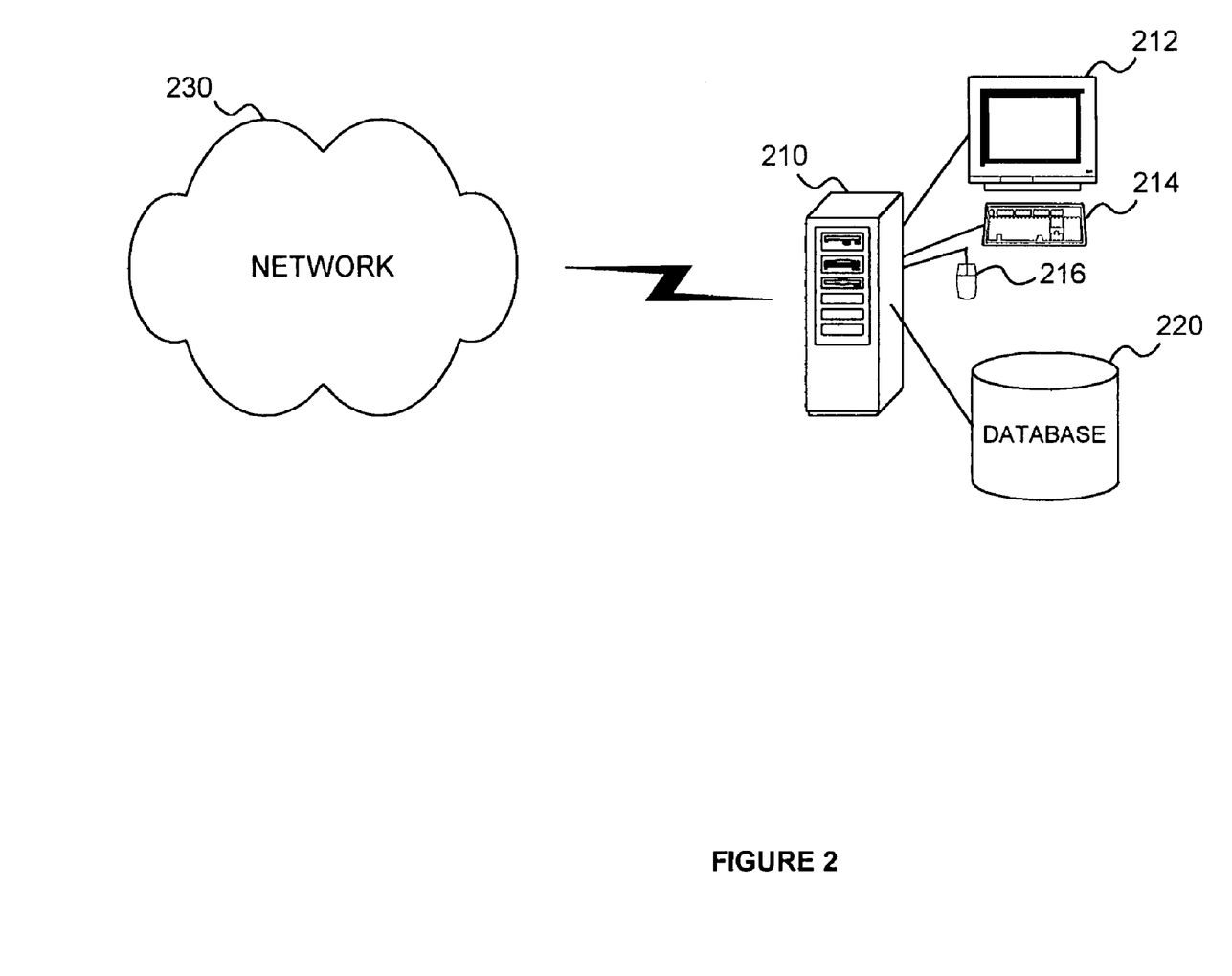
FIG. 2 illustrates a block diagram of an embodiment of a network server constructed in accordance with the principles of the present invention.

Turning now to FIG. 2, illustrated is a block diagram of an embodiment of a network server 210 constructed in accordance with the principles of the present invention. The server 210 is a conventional server computer that includes a monitor 212, a keyboard 214 and a pointing device 216. In the illustrated embodiment, the pointing device 216 is a conventional mouse. In another embodiment, the server 210 may be a specialized computer system not requiring the monitor 212, the keyboard 214 and the pointing device 216.

The server 210 may further include tape, compact disc and holographic drives, telephony systems, devices (including videophone, paging and facsimile technologies), and serial and parallel ports. The server 210 may still further include network adapters, transceivers and modems (not shown) that allow the server 210 to connect to different types of networks.

The server 210 is coupleable to a network 230 or a plurality of networks such as an LAN, a WAN, an Intranet, an Extranet, the Internet, a public switched telephone network ("PSTN") or a combination thereof. The server 210 receives requests, processes information received and send responses via the network 230. In one embodiment, the server 210 may be coupled to a network 230 that includes a PSTN which allows the server 210 to connect to other devices that require the use of or that are accessible through the PSTN. For example, the server 210 may access telephones, pagers, mobile phones, or dial-up services.

The server 210 is also coupled to a database 220. The database 220 may be embodied in a storage device, memory or a combination of the two. In one embodiment, the database 220 may include a flat file system, a relational database system or a combination thereof. The database 220 also includes different types of information required to fulfil the needs of the devices accessing the server. For example, the database 220 may include customer information relating to Internet transactions, information relating to devices that access and/or request information from the server 210 or specialized data relating to application programs running on the server 210.

Figure 3:
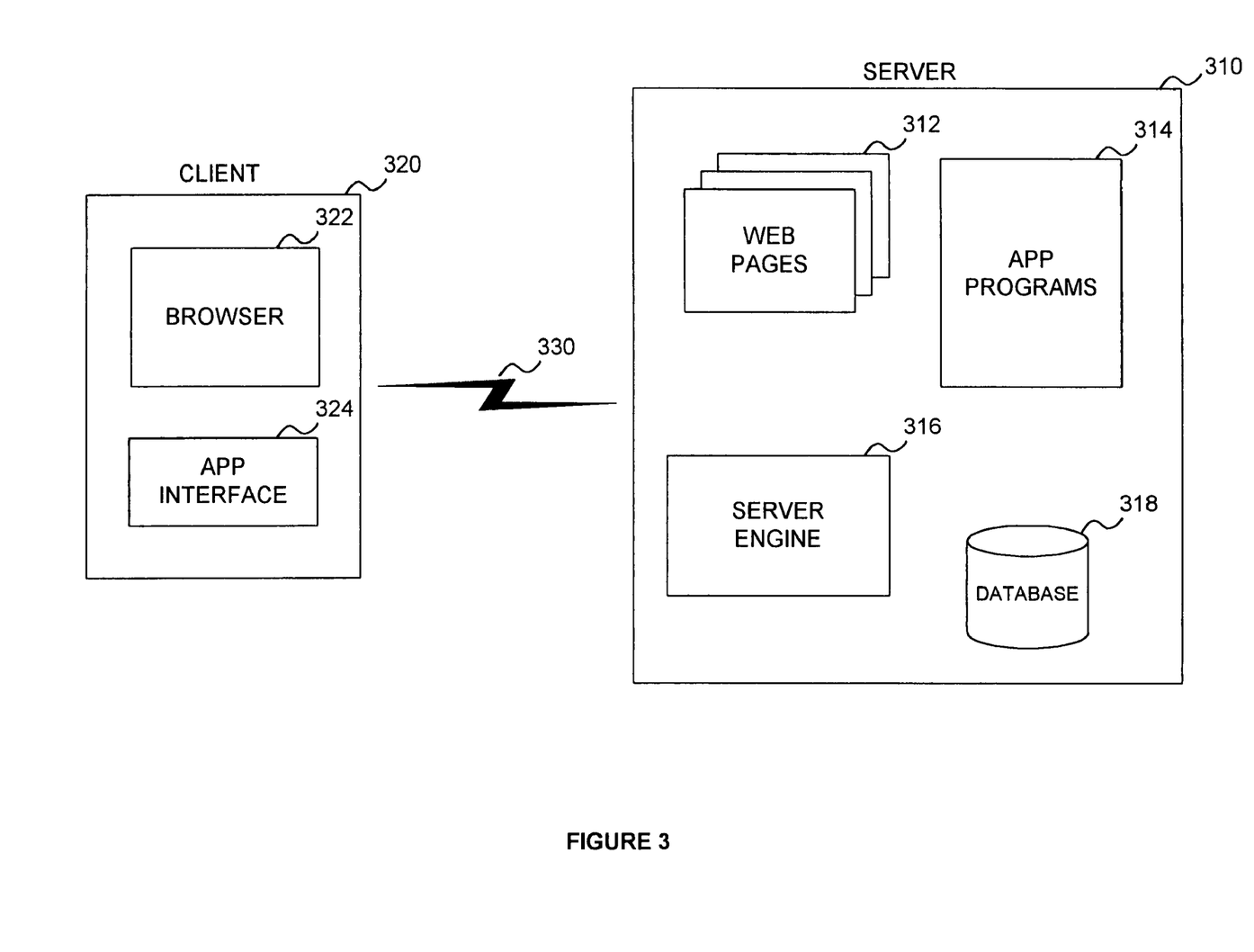
FIG. 3 illustrates a block diagram of an embodiment of a server system and a client system constructed in accordance with the principles of the present invention.

Turning now to FIG. 3, illustrated is a block diagram of an embodiment of a server system 310 and a client system 320 constructed in accordance with the principles of the present invention. In the illustrated embodiment, the server system 310 includes a set of Web pages 312, application programs 314, a server engine 316 and a database 318. The set of Web pages 312 are files that describe how to display and process graphical information, textual information and audio on the client system 320. In another embodiment of the present invention, the set of Web pages 312 may be X-Windows program files used to display and process information on X-Windows compatible systems.

Most Web pages are written in a language called Hypertext Markup Language ("HTML"). HTML is the set of "markup" symbols or codes inserted in a file intended for display on a World Wide Web browser. The markup tells the Web browser how to display a Web page's text and graphical images on the client's computer system. The individual markup codes are referred to as elements (also called "tags").

Another popular language used is the Extensible Markup Language ("XML"). XML is a flexible way to create common information formats and share both the format and the data on the World Wide Web, Intranets, Extranets and other types of networks. For example, computer makers might agree on a standard or common way to describe the information about a computer product (processor speed, memory size, and so forth) and then describe the product information format using XML. Such a standard way of describing data would enable a user to send an intelligent agent (e.g., a program) to each computer maker's Web site, gather data, and then make a valid comparison. XML can also be used by any individual or group of individuals or companies that wants to share information in a consistent way. Those skilled in the pertinent art are familiar with HTML and XML.

The server system 310 also includes the application programs 314 including specialized programs that can control and monitor the actions of the server system 310 or perform specific functions that add substantial utility to the server system 310. The application programs 314 may be one or more separate programs or callable routines accessible by other programs within the server system 310 or by the client system 320. Examples of application programs are applets and servlets.

An applet is an application program written usually in the object-oriented programming language Java. The applet program can be sent along with a Web page to a user. The Java applets can perform interactive animations, immediate calculations, or other simple tasks without having to send a user request back to the server. In another embodiment, applets can be located in a server and used to perform some function in another server.

A servlet is a small program that runs on a server. The term was coined in the context of the Java applet. A servlet processes requests from specific Java applets and usually performs specific functions on the server. Servlets can be associated with specific applets or can accommodate a variety of applets.

Some programs, often those that access databases based on user input, preferably should be located and executed on the server system 310. Typically, these have been implemented using a Common Gateway Interface ("CGI") application. With a Java virtual machine running in the server system 310, however, such programs can be implemented with the Java programming language. The advantage of a Java servlet is that they can execute more quickly than CGI applications on the server system 310 under load conditions.

Rather than causing a separate program process to be created, each user request is invoked as a thread in a single daemon process, meaning that the amount of system overhead for each request is slight. Those skilled in the pertinent art are familiar with and the use of applets, servlets, threads and daemon processes.

In the illustrated embodiment, the server system 310 also includes a server engine 316 and a database 318. The server engine 316 handles requests from the client system 320 via a communications link 330. The communications link 330 may be a direct connection line, a PSTN connection or a network connection.

In processing requests from the client system 320, the server engine 316, in one embodiment, establishes a TCP connection and allocates system resources in order to process the client system's request. Depending upon the type of request, the server engine 316 can process the request or pass the request to the application programs 314 to process. In other embodiments, the establishment of a TCP connection can be performed by other programs and/or hardware in the server 310. One skilled in the pertinent art is familiar with TCP connections and the processing of requests received over a network connection.

The server engine 316 can process requests for downloading the set of Web pages 312, retrieve and store information in the database 318, perform transaction processing and other miscellaneous functions performed by the server system 310. In one embodiment, the server engine 316 may be incorporated into the applications programs 314. In another embodiment, the server engine 316 may be, for instance, a reentrant program, multi-threaded program, multiple instances of the program or a combination thereof.

The database 318 may be a relational database system or a custom database system. The database 318 may be embodied in one or more separate hardware devices or embodied in hardware within the server system 310. The database 318 may include customer information, specialized application information, transactional information, status information or a combination thereof.

The client system 320 is conventionally a computer system that includes a browser 322 and an application interface 324. The browser 322 may be a conventional Internet browser or a specialized program used to display, access and process information. The browser 322 can request the set of Web pages 312 to be downloaded from the server system 310. Once one Web page is downloaded, the browser 322 will process the Web page and possibly display the information described in a Web page file associated with the Web pages 312. In one embodiment, the browser 322 uses HTML and XML languages in processing the Web pages. In another embodiment, the browser 322 can also process Java files and programs such as applets.

An application interface 324 is a program or set of programs that run on the client system 320 and interfaces with the server system 310 via the communication link 330. The application interface 324 can include network programs, GUIs, specialized application programs, communication programs, database programs or a combination thereof.

The previously described embodiments of the computer network, application programs and server and client systems are submitted for illustrative purposes only. Of course, other networks and systems are employable in connection with the principles of the present invention.

Figure 4:
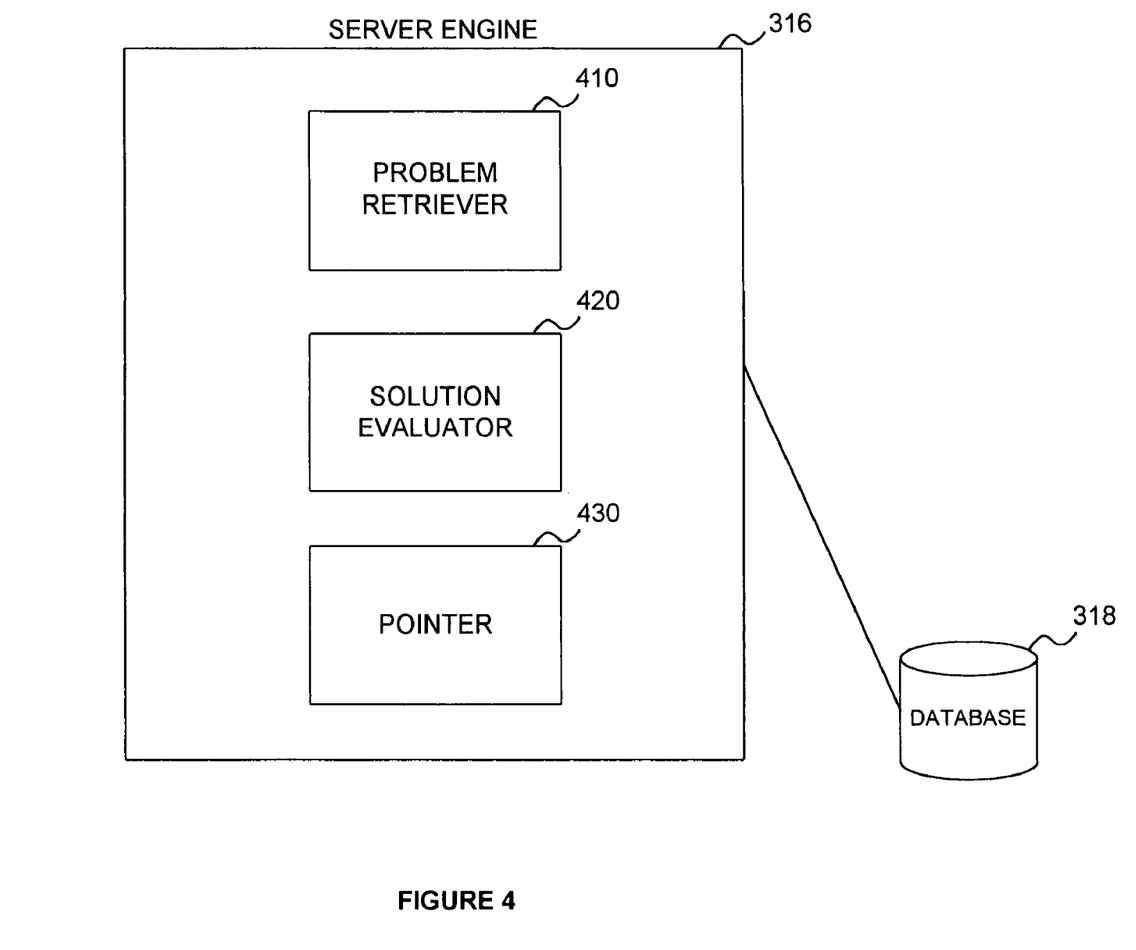
FIG. 4 illustrates a block diagram of an embodiment of a system for controlling access to a resource of a computer system constructed in accordance with the principles of the present invention.

Turning now to FIG. 4, illustrated is a block diagram of an embodiment of a system for controlling access to a resource of a computer system constructed in accordance with the principles of the present invention. While the illustrated embodiment is directed to controlling access to a Web-based server, it should be clear that the system of the present invention is equally applicable to controlling access to any type of resource of a computer system. For example, the system of the present invention can control access to databases, MPEG files and MP3 sound files.

The system of the instant embodiment is embodied in the server engine 316 employable in the server system 310 of FIG. 3. In other embodiments, the present invention may be embodied in other programs, firmware or combination of the two within a server system. In yet another embodiment, the present invention may be embodied in part in a client system as a browser or the application interface and part in a server system as introduced with respect to the preceding FIGUREs.

In the illustrated embodiment, the database 318 includes problems and corresponding precalculated solutions used in controlling access to a resource of the server 310. In one embodiment, the problems comprise outputs and portions of corresponding inputs to a one-way function. A one-way function usually takes a variable-length input string and coverts it to a fixed length output string. One-way functions are relatively easy to compute, but significantly harder to reverse. For example, given "x" it is easy to compute f (x). Given f (x), however, it will take a longer time to compute "x." In some cases, computing "x" can take $2^n$ calculations where "n" is the number bits in the output string. Background information concerning one-way functions is discussed in *Applied Cryptography, Protocols, Algorithms, and Source Code in C*, by Bruce Schneier, John Wiley & Sons, Inc. $2^{nd}$ Edition (1996), and herein incorporated by reference.

In a related embodiment, the one-way functions are Message Digest-5 ("MD5") functions. In yet another related embodiment, the one-way functions are Secure Hash Algorithm ("SHA") functions. One skilled in the pertinent art is familiar with MD5 and SHA functions. Of course, other types of functions or problems that incur longer computational times to determine the input to the function or problem than the computational time required to determine the output are well within the broad scope of the present invention.

In the illustrated embodiment, the server engine 316 includes a problem retriever 410, a solution evaluator 420 and a pointer 430 all of which are also associated with the database 318. In another embodiment, the pointer 430 may not be included in the server engine 316. In yet another embodiment, the problem retriever 410, the solution evaluator 420 and the pointer 430 may be embodied in other software, hardware, firmware or the combination thereof within the server 310.

Prior to the present invention, when a client computer system or any other computer system wanted to access a resource of a server on a network, such as a web page, the client computer system first established a connection with the server. In establishing a connection, the server allocated stack space for the client and sent an acknowledgment to the client. The client then sent the appropriate requests to access the desired resource. If the client, however, did not respond after receiving the acknowledgment, the client's allocated stack space was kept for a period of time on the server. This delay in deallocating stack space is the basis for connection depletion attacks.

In connection depletion attacks, an attacking system or user will try to make a large number of connection requests to a server in a short period of time. For each connection request, the server allocates stack space to process future requests associated with that particular connection. After the connection is established, the attacking system does not send any further requests on that connection. This causes the server to leave stack space allocated for the established connection. Eventually, the server depletes its available stack space and the server is unable to process new requests. Connection depletion attacks can prevent companies from accepting orders, processing information, displaying advertisements and processing other functions that allow companies to generate revenue.

In one embodiment of the present invention, the present invention combats connection depletion attacks by sending a problem to the client that requests access to a resource. The client must first solve the problem and send back a putative solution to the problem. The present invention verifies the putative solution before granting the client access to the desired resource.

In the illustrated embodiment of the present invention, the present invention uses the database 318, the problem retriever 410, the solution evaluator 420 and the pointer 430 to combat connection depletion attacks. As described above, the database 318 contains problems and corresponding precalculated solutions. The pointer 430 points to a particular problem/solution entry in the database 318.

When a client requests access to a resource, the problem retriever 410 responds to the request by retrieving a problem from the database 318 according to the pointer 430. The pointer 430 can contain an entry number or a relational index. In another embodiment of the present invention, the problem retriever 410 can use any method to access and retrieve problems from the database 318 with or without a pointer.

The problem retriever 410 transmits the problem to the client to solve without allocating any system resources, such as stack space. In another embodiment, the problem retriever 410 transmits the problem and the pointer 430 to the client. The problem retriever 410 then increments the pointer 430. If the pointer 430 exceeds the number of entries in the database 318, the pointer 430 wraps to the beginning entry of the database 318.

The client then solves the problem. For example, if the problem is a MD5 function, the client may be given 120 bits of a 160 bit input and all of the output. The client has to compute the remaining 40 bits of input that when combined with the 120 bits will generate the output. The client incurs computation time (or cost) in order to compute the solution. The amount of input bits to compute and the type of function used can be changed to produce the desired amount of computation time incurred by the client. In one embodiment, the problem retriever 410 can dynamically adjust these problem factors to increase or decrease computation time based on the number of and the interval of requests. In one embodiment, the problem retriever 410 can dynamically adjust the problem factors based upon the number of requests from a given location or group of locations. In yet another embodiment, the solution evaluator 420 or any other software and/or hardware within the server 310 can adjust the problem factors.

Once the client has solved the problem, the client sends the putative solution back to the solution evaluator 420. In another embodiment, the client sends the putative solution and the associated pointer back to the solution evaluator 420. The solution evaluator 420 employs the database 318 to validate the putative solution using the precalculated solution that corresponds to the problem sent to the client. If the putative solution is valid, the solution evaluator 420 grants the client access to the desired resource. In one embodiment, the resource is a network server, an electronic mail server or a main database. In another embodiment, the solution evaluator 420 will establish a connection and allocate stack space or memory upon receiving a valid solution. The server 310 will then process the client's future requests associated with that particular connection.

In the illustrated embodiment, the solution evaluator 420 uses the returned pointer in validating the putative solution. The pointer allows the solution evaluator 420 to index into or relationally access the database 318 without having to maintain a list of problems per request or search the database 318 for the problem and the corresponding precalculated solution. By sending and receiving the pointer 430 that is associated with the problem sent to the client, the problem retriever 410 and the solution evaluator 420 can run stateless. The problem retriever 410 and the solution evaluator 420 do not have to maintain information to associate which problems where sent to which clients. Also, the server 310 does not or is not required to incur more computation time than the client in validating the client's putative solution.

Once the solution evaluator 420 receives a valid putative solution, the problem retriever 410 replaces that problem and the corresponding precalculated solution. In one embodiment, the problem retriever 410 determines a new problem and calculates the corresponding solution only when the received putative solution is valid. In another embodiment, the problem retriever 410 can retrieve a new problem and corresponding precalculated solution from a list or database of problems. In yet another embodiment, the solution evaluator 420 can determine a new problem and calculate the solution to the problem.

Figure 5:
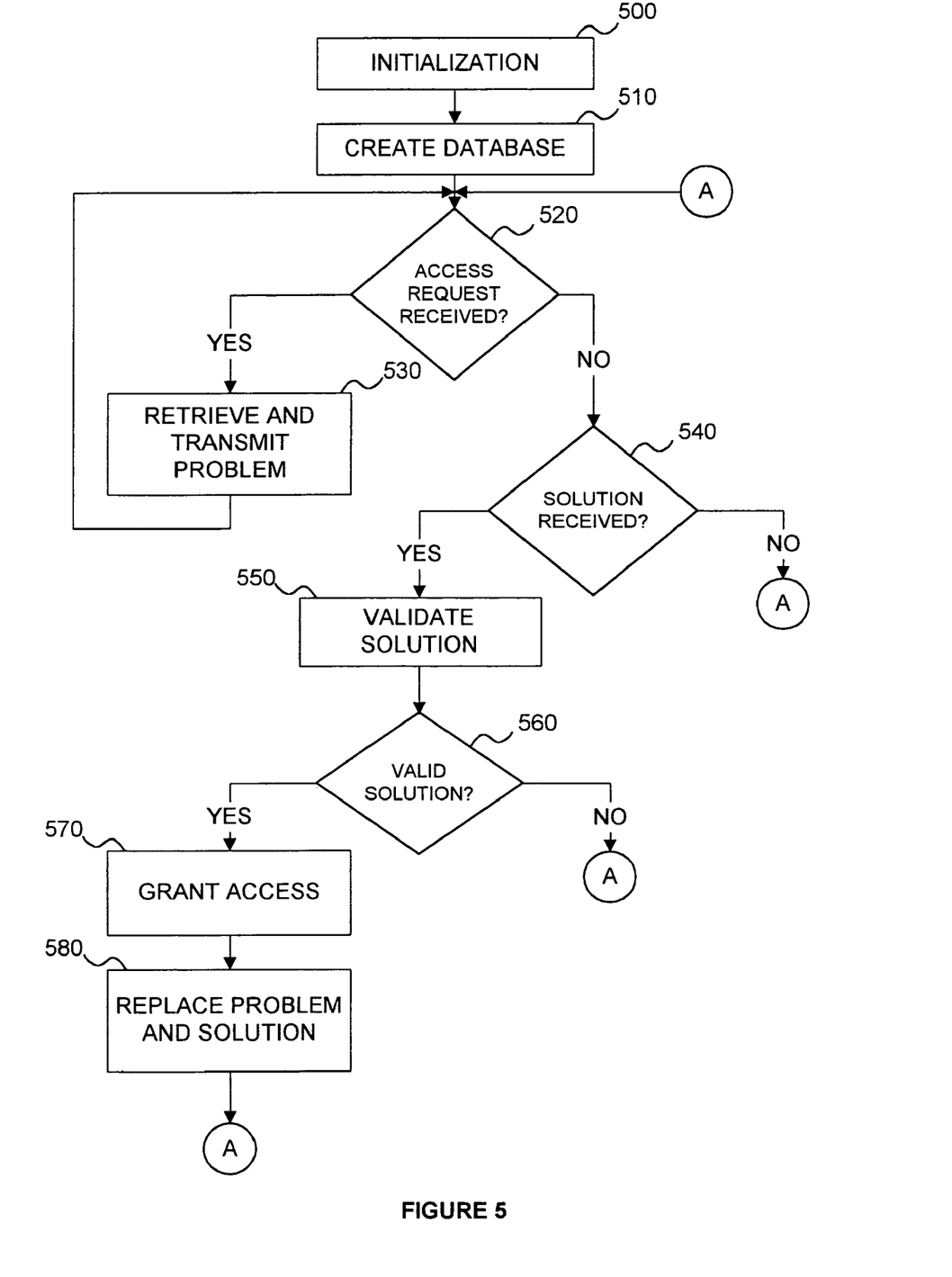
FIG. 5 illustrates a flow diagram of an embodiment of a method of controlling access to a resource of a computer system constructed in accordance with the principles of the present invention.

Turning now to FIG. 5, illustrated is a flow diagram of an embodiment of a method of controlling access to a resource of a computer system constructed in accordance with the principles of the present invention. In FIG. 5, the computer system first performs initialization in a step 500.

After initialization, the computer system creates a database of problems and corresponding precalculated solutions in a step 510. In one embodiment of the present invention, the problems are portions of inputs to a one-way function. In a related embodiment, the one-way functions are MD5 functions or SHA functions. Of course, however, the present invention is not limited to one-way functions or specifically to the MD5 and SHA functions. In other embodiments, other types of functions that will cause a client that requests access to the computer system more computational time than the computer system is within the broad scope of the present invention.

Next, the computer system determines if there is a request from a client to access a resource of the computer system in a decisional step 520. In one embodiment, the resource may include a network server, an electronic mail server and a main database. Of course, other types of resources that are associated with a computer system are well within the broad scope of the present invention.

If the computer system received an access request, the computer system retrieves a problem from the database of problems in a step 530. After retrieving the problem, the computer system transmits the problem to the client and returns to determine if another access request was received in the decisional step 520. If the computer system did not receive an access request, the computer system determines if a putative solution was received in a decisional step 540. If no putative solution was received, the computer system returns to determine if another access request was received in the decisional step 520.

If the computer system received a putative solution, the computer system employs the database to validate the putative solution in a step 550. The computer system retrieves the precalculated solution that corresponds to the problem sent to the client. The computer system uses precalculated solutions in the validation process to prevent the computer system from expending more computational time than was required by the client to calculate the solution. This also prevents the computer system from re-computing solutions to problems sent to the clients, especially if the client is sending random bits or guesses as the putative solutions.

The computer system then determines if the putative solution is valid by comparing the putative solution received with the precalculated solution in a decisional step 560. If the putative solution is not valid, the computer system does not grant access and returns to determine if another access request was received in the decisional step 520.

If the putative solution is valid, the computer system grants the client access to the desired resource in a step 570. In one embodiment, the computer system allocates memory associated with the resource to serve the client. In another embodiment, the computer system establishes a connection and allocates protocol stack space to handle further client requests associated with that connection.

Next, the computer system replaces the problem that was solved by the client with a new problem, calculates a new solution and stores the information in the database in a step 580. In another embodiment, the computer system may adjust the complexity of the problems to cause the client to expend more or less computational time to determine the solution. The adjustment of the problem complexity allows the computer system to regulate the number of successful accesses within a given period. The computer system then returns to determine if another access request was received in the decisional step 520.

One skilled in the art should know that the present invention is not limited to processing the requests described above. Other embodiments of the present invention may process additional types of requests and may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A system for controlling access to a resource of a computer system, comprising:
    a database of problems and corresponding precalculated solutions;
    a problem retriever that responds to a request from a client for access to said resource by retrieving one of said problems from said database and transmitting said one of said problems to said client without allocating resources of said computer system, wherein said problems and said corresponding precalculated solutions exist before said request; and
    a solution evaluator that, upon receiving a putative solution from said client, employs said database to validate said putative solution and, if said putative solution is valid, grants said client access to said resource.

2. The system as recited in claim 1 wherein said problems comprise outputs and portions of corresponding inputs to a one-way function.

3. The system as recited in claim 2 wherein said one-way function is a Message Digest-5 function.

4. The system as recited in claim 1 wherein said problem retriever replaces said one of said problems and a corresponding one of said solutions when said putative solution is valid.

5. The system as recited in claim 1 wherein said problem retriever replaces said one of said problems and a corresponding one of said solutions only when said putative solution is valid.

6. The system as recited in claim 1 wherein said solution evaluator grants said client access to said resource by allocating memory associated with said resource to serve said client.

7. The system as recited in claim 1 wherein said resource is selected from the group consisting of:
    a network server,
    an electronic mail server, and
    a main database.

8. The system as recited in claim 1 wherein said problem retriever retrieves said problem employing a pointer and transmits said pointer with said problem to said client and said solution evaluator receives said pointer with said putative solution and employs said pointer for validating said putative solution.

9. The system as recited in claim 1 wherein said problems are independent of said client.

10. A method of controlling access to a resource of a computer system, comprising:
    creating a database of problems and corresponding precalculated solutions;
    responding to a request from a client for access to said resource by retrieving one of said problems from said database and transmitting said one of said problems to said client without allocating resources of said computer system, wherein said problems and said corresponding precalculated solutions exist before said request;
    upon receiving a putative solution from said client, employing said database to validate said putative solution; and
    if said putative solution is valid, granting said client access to said resource.

11. The method as recited in claim 10 wherein said problems comprise outputs and portions of corresponding inputs to a one-way function.

12. The method as recited in claim 11 wherein said one-way function is a Message Digest-5 function.

13. The method as recited in claim 10 further comprising replacing said one of said problems and a corresponding one of said solutions when said putative solution is valid.

14. The method as recited in claim 10 further comprising replacing said one of said problems and a corresponding one of said solutions only when said putative solution is valid.

15. The method as recited in claim 10 wherein said granting comprises allocating memory associated with said resource to serve said client.

16. The method as recited in claim 10 wherein said resource is selected from the group consisting of:
    a network server,
    an electronic mail server, and
    a main database.

17. The method as recited in claim 10 further comprising employing a pointer for said retrieving and transmitting said pointer with said problem to said client and receiving said pointer with said putative solution and employing said pointer for said validating.

18. The method as recited in claim 10 wherein said problems are independent of said client.

* * * * *